United States Patent
Kwon

(10) Patent No.: US 8,326,457 B2
(45) Date of Patent: Dec. 4, 2012

(54) APPARATUS FOR DETECTING USER AND METHOD FOR DETECTING USER BY THE SAME

(75) Inventor: Soon-Il Kwon, Seoul (KR)

(73) Assignee: Korea Institute of Science and Technology (KR)

( * ) Notice: Subject to any disclaimer, the term of this patent is extended or adjusted under 35 U.S.C. 154(b) by 850 days.

(21) Appl. No.: 12/373,141

(22) PCT Filed: Jan. 14, 2008

(86) PCT No.: PCT/KR2008/000225
§ 371 (c)(1),
(2), (4) Date: Jan. 9, 2009

(87) PCT Pub. No.: WO2008/088154
PCT Pub. Date: Jul. 24, 2008

(65) Prior Publication Data
US 2010/0138040 A1 Jun. 3, 2010

(30) Foreign Application Priority Data
Jan. 18, 2007 (KR) .................... 10-2007-0005798

(51) Int. Cl.
*G10L 17/00* (2006.01)
(52) U.S. Cl. ...................... 700/246; 704/257
(58) Field of Classification Search ............ 700/246, 700/245; 318/568.16; 704/257, 263, 266, 704/270.1, 255, 275, 277, 231, 243–245
See application file for complete search history.

(56) References Cited

U.S. PATENT DOCUMENTS

| 6,442,519 | B1 * | 8/2002 | Kanevsky et al. | 704/243 |
| 7,496,693 | B2 * | 2/2009 | Cook et al. | 710/10 |
| 7,613,601 | B2 * | 11/2009 | Murata et al. | 704/9 |
| 2003/0158727 | A1 * | 8/2003 | Schultz | 704/207 |

FOREIGN PATENT DOCUMENTS

| JP | 2005-062866 | 3/2005 |
| KR | 10-2006-0058747 | 5/2006 |
| KR | 10-2006-0064494 | 6/2006 |

OTHER PUBLICATIONS

International Search Report and Written Opinion mailed Feb. 27 2008 in corresponding PCT International Application No. PCT/KR2008/000225.

\* cited by examiner

*Primary Examiner* — Dalena Tran
(74) *Attorney, Agent, or Firm* — Ostrolenk Faber LLP

(57) ABSTRACT

An apparatus for identifying a user in a service robot for domestic use is provided, the apparatus comprising a feature vector classifying unit for classifying feature vectors converted from a user voice signal for statistics into a feature vector not causing a user identification error and a feature vector causing the user identification error to thereby set user modes corresponding to the respective feature vectors for each user, and an identifying unit for identifying the user by utilizing the classification result of the feature vector classifying unit as data for the user identification. Accordingly, time restriction caused when the service robot for domestic use identifies who a user is can be overcome, and, the degradation of the user identification due to the lack of absolutely needed data amount when the user is identified only by the user's short voice can be solved.

9 Claims, 4 Drawing Sheets

APPARATUS FOR DETECTING USER AND METHOD FOR DETECTING USER BY THE SAME

CROSS-REFERENCE TO RELATED APPLICATIONS

The present application is a 35 U.S.C. §§371 national phase conversion of PCT/KR2008/000225, filed Jan. 14, 2008, which claims priority of Korean Patent Application No. 10-2007-0005798, filed Jan. 18, 2007, the disclosure of which has been incorporated herein by reference. The PCT International Application was published in the English language.

TECHNICAL FIELD

The present invention relates to a service robot for domestic use, and more particularly, to an apparatus for the service robot to detect (or, identify) who a user is, by recognizing the characteristics of the user's voice with overcoming time restriction when the service robot detects (or, identifies) who the user is, and a method for identifying a user using the same.

BACKGROUND ART

Generally, In order to recognize a user only based upon voice information, a speaker recognition method based on voice signal processing and pattern matching may be used. The speaker recognition is to distinguish who is speaking, namely, whose voice it is. Such speaker recognition is required in various fields. For example, such speaker recognition is required in a speaker authentication system using voice information, a voice extracting system, a speaker recognition and information extracting system using a voice signal from online multi-party communications, a real-time speaker tracking system using multi-modal information and the like.

A user-recognizing method based upon the related speaker recognition is implemented by collecting voice data of target users, extracting feature vectors therefrom, and creating a statistical model for each user using the feature vectors. A GMM (Gaussian Mixture Model) which is the statistical model using the feature vector is widely used as a model for each user.

As such, previously created models are used for user recognition. When receiving a voice signal of a user, a feature vector for this voice signal is compared with user models, and accordingly a user whose the feature tag is the most probably similar to the feature vector from the user models is selected using a maximum likelihood method to thusly be identified as the user of the voice inputted.

However, in case of using the general speaker recognition, voice information longer than at least 2~4 seconds is required to obtain about over 90% accuracy.

Such method may cause user's inconvenience when it is applied to the user recognition of a robot. That is, upon identifying a user only using a user's voice as short as one-word length, for example, the lack of absolutely needed data amount may cause a decrease in performance of the user recognition. Also voice information longer than at least 2~4 seconds required for over 90% accuracy makes the execution speed slow.

DISCLOSURE OF THE INVENTION

Therefore, in order to solve those problems, it is an object of the present invention to provide an apparatus for identifying (recognizing) who a user is, capable of overcoming time restriction caused when a service robot for domestic use identifies who the user is, and a method for identifying the user using the same.

It is another object to provide an apparatus for identifying who a user is, capable of overcoming the problem causing degradation of a user recognition performance due to the lack of absolutely needed data amount when the user is identified only by using his short voice, and a method for identifying a user using the same.

It is still another object to provide an apparatus for identifying who a user is, capable of overcoming the problem in that an execution speed becomes slow due to the need of voice information longer than at least several seconds in order to obtain a certain level of accuracy in the related art method for identifying the user.

To achieve these objects, there is provided an apparatus for identifying who a user is, in accordance with one embodiment of the present invention comprising: a feature vector classifying unit configured to classify feature vectors of a real voice signal of a user according to user models previously set based upon feature vectors previously converted from a user voice signal for statistics; and a identifying unit configured to compare the feature vectors of the real voice signal with the user models to identify who the user is.

Here, the apparatus for identifying the user may be applied to a service robot for domestic use.

The feature vectors may be classified into a first-type feature vector which does not cause a user identification error and a second-type feature vector which causes the user identification error.

The identifying unit may compare the feature vector of the real voice signal with the user models by using a maximum likelihood method.

The feature vector classifying unit may classify the feature vectors of the real voce signal into a feature vector having a non-overlapped characteristic in statistical models and a feature vector having an overlapped characteristic in the statistical models, according to the comparison result of the feature vectors of the real voice signal with the user models.

The identifying unit may use only the feature vector of the real voice signal having the non-overlapped characteristic in the statistical models, when comparing with the user models according to a maximum likelihood method.

In another embodiment to achieve those objects of the present invention, there is provided an apparatus for identifying a user comprising: a feature vector classifying unit configured to classify feature vectors converted from user voice signals for statistics into a feature vector not causing a user identification error and a feature vector causing the user identification error and to classify feature vectors of a real voice signal of the user according to user models previously set for each user, the user model corresponding to each feature vector causing or not causing the user identification error; and a identifying unit configured to identify who a user is, by utilizing the classification result of the feature vector classifying unit as data for the user identification, wherein the user is recognized only by using the feature vector classified as a feature vector not causing the user identification error among the feature vectors of the real voice signal of the user.

In one embodiment to achieve those objects of the present invention, there is provided a service robot for domestic use comprising: an input unit configured to receive external sound; a feature vector extracting unit configured to receive a signal from the input unit and convert the received signal into feature vectors; a feature vector classifying unit configured to classify the feature vectors for the external sound according to user models previously set based upon the feature vectors previously converted from a user voice signal for statistics; a identifying unit configured to identify a user only by utilizing a certain feature vector among feature vectors classified by the feature vector classifying unit; and a controlling unit configured to control a command executing unit according to the determination result of the identifying unit.

Here, the external sound may be a user's voice signal.

The input unit may comprise a microphone.

The feature vector classifying unit may classify the feature vectors corresponding to the external sound into a feature vector having a non-overlapped characteristic in statistical models and a feature vector having an overlapped characteristic in the statistical models.

The identifying unit may use only the feature vector of the external sound having the non-overlapped characteristic in the statistical models when comparing with the user models.

In one embodiment to achieve those objects of the present invention, there is provided a method for identifying who a user is, by a service robot for domestic use, comprising: receiving voice; extracting feature vectors from a signal of the voice; comparing the feature vectors with preset user models to classify the feature vectors into a first-type feature vector not causing a user identification error and a second-type feature vector causing the user identification error; and comparing the first-type feature vector with the preset user models to identify who the user is.

Here, the feature vector and the user models are compared with each other according to a maximum likelihood method.

Also, the first-type feature vector and the user models are compared with each other according to a maximum likelihood method.

Effect of the Invention

Therefore, the present invention provides an enhanced apparatus for identifying a user and a method for identifying a user using the same, so as to effectively overcome time restriction which should be solved when a service robot for domestic use identifies who a user is.

Also, the present invention provides the enhanced apparatus for identifying a user and the method for identifying a user using the same, so as to effectively overcome the problem causing the degradation of the user identification performance due to the lack of absolutely needed data amount when the user is identified only by his short voice.

In addition, the present invention provides the enhanced apparatus for identifying a user and the method for identifying a user using the same, so as to effectively overcome the problem of the slow execution speed due to the need of voice information longer than at least several seconds in order to obtain a certain level of accuracy.

MODES FOR CARRYING OUT THE PREFERRED EMBODIMENTS

Description will now be made in detail to the preferred embodiments of the present invention, examples of which are illustrated in the accompanying drawings. It is intended to help those skilled in the art understand the present invention more obviously, and thus the embodiments cannot be construed to limit the scope of the present invention.

Figure 1:
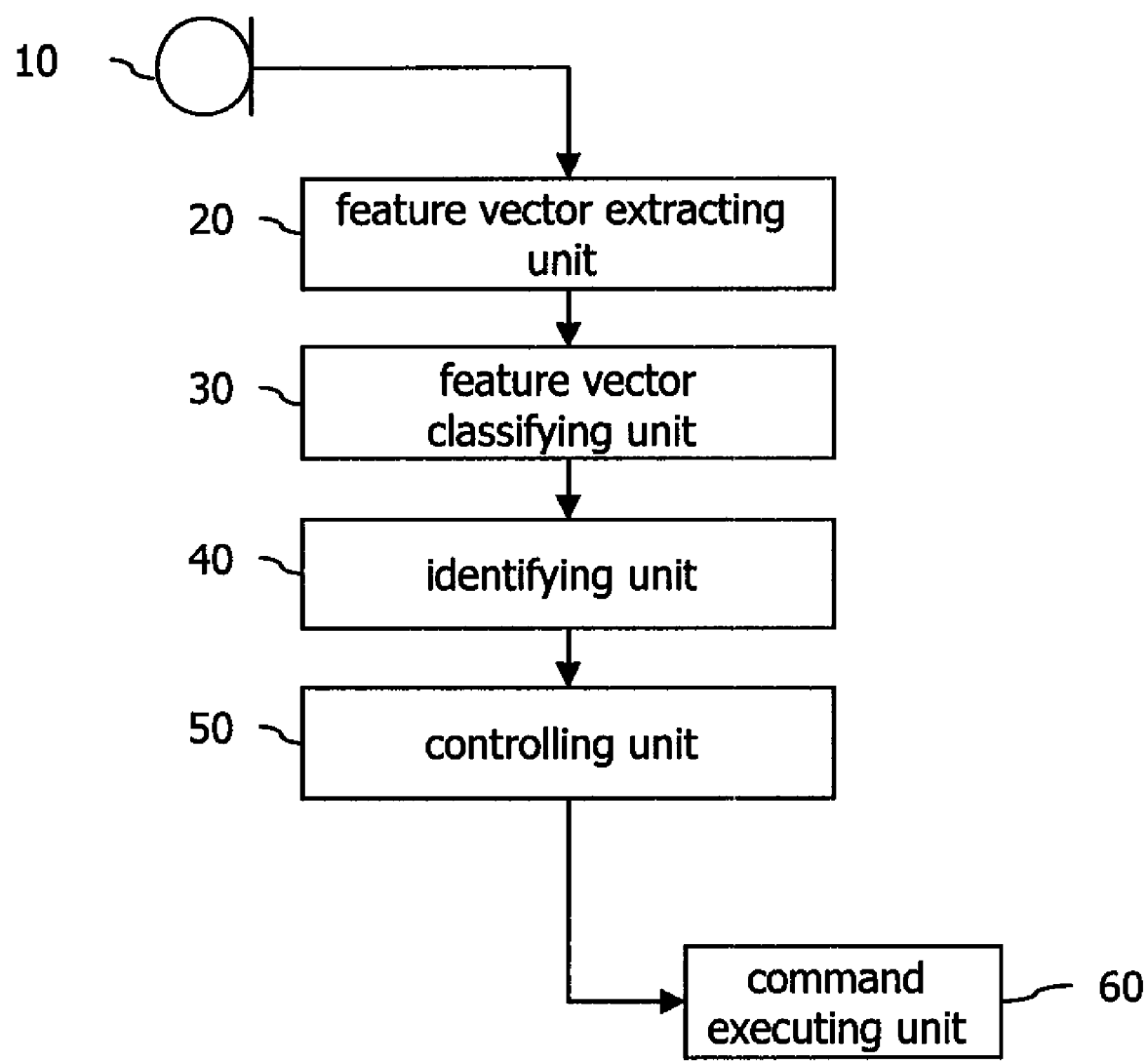
FIG. 1 is a block diagram showing an apparatus for identifying a user in accordance with one embodiment of the present invention.

FIG. 1 is a block diagram showing an apparatus for identifying who a user is, in accordance with one embodiment of the present invention.

As shown in FIG. 1, the apparatus for identifying (recognizing) who a user is may include a feature vector classifying unit 30 and an identifying unit 40.

The feature vector classifying unit 30 may classify feature vectors of a real voice signal of the user, according to user models previously set based upon feature vectors previously converted from a user voice signal for statistics.

The feature vectors of the real voice signal of the user may be divided into a first-type feature vector which does not cause a user identification error and a second-type feature vector which causes the user identification error.

The identifying unit 40 may receive the real voice signal which is compared with the user models, thereby identifying who the user is.

For example, the identifying unit 40 may compare the feature vectors of the real voice signal with the preset user models using a maximum likelihood method. Then, according to the comparison result of the feature vectors of the real voice signal with the user models, the identifying unit 40 may classify each feature vector of the real voice signal into a feature vector of the real voice signal having a non-overlapped characteristic in the statistical models, and a feature vector of the real voice signal having an overlapped characteristic. Also, the identifying unit 40 may use only the feature vector of the real voice signal having the non-overlapped characteristic in the statistical models when comparing with the user models according to the maximum likelihood method.

The voice signal for statistics is a user's voice signal for setting user models, and the real voice signal is a user's voice signal when actually executing the apparatus for identifying who the user is.

Figure 2:
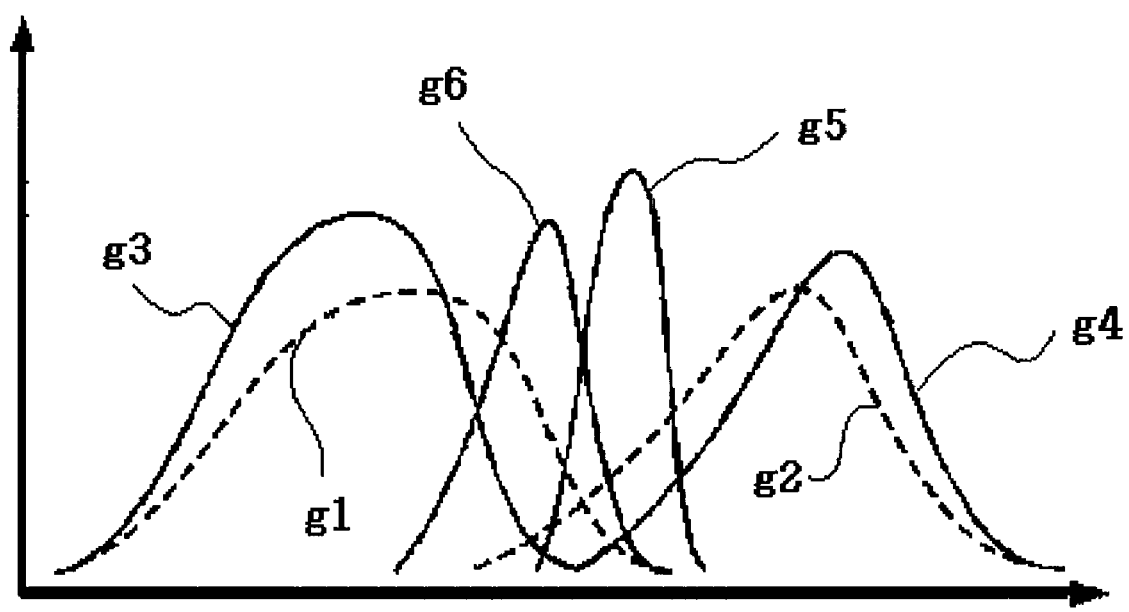
FIG. 2 is a graph showing exemplary statistical models using feature vectors.

Exemplary statistic models using the feature vectors are shown in FIG. 2.

That is, FIG. 2 is a graph showing exemplary statistical models using feature vectors, which shows six graphs g1 to g6.

g1, g3 and g5 are graphs showing statistical models of a first user, and g2, g4 and g6 are graphs showing statistical models of a second user. FIG. 2 exemplarily shows two users but more than two users may be available.

g1 is a conventional model of the first user, g2 is a conventional model of the second user, and g3 to g6 are user models proposed according to the present invention. In particular, g3 and g5 are two first-user models for g1, and g4 and g6 are two second-user models for g2. Here, g3 and g4 are non-overlapped user models, and g5 and g6 are overlapped user models.

The apparatus for identifying who the user is, in accordance with the embodiment, may be applied to a service robot for domestic use.

The service robot for domestic use will be described with reference FIG. 1 as follows.

The service robot for domestic use may include an input unit 10, a feature vector extracting unit 20, a feature vector classifying unit 30, an identifying unit 40, a controlling unit 50 and a command executing unit 60.

The input unit 10 may serve to receive external sounds, which may be a microphone.

The feature vector extracting unit 20 may receive a signal from the input unit 10 to convert it into a feature vector.

The feature vector classifying unit 30 may classify feature vectors of a real voice signal, according to user models previously set based upon feature vectors previously converted from the user voice signals for statistics.

For example, the feature vector classifying unit 30 may classify feature vectors corresponding to external sounds into a feature vector having a non-overlapped characteristic in the statistical models and a feature vector set having an overlapped characteristic in the statistical models.

The identifying unit 40 may identify who the user is only by utilizing a certain feature vector among the feature vectors classified by the feature vector classifying unit 30.

For example, the identifying unit 40 may compare only the feature vector having the non-overlapped characteristic in the statistical models with user models according to the maximum likelihood method.

The controlling unit 50 may control the command executing unit (not shown) according to the result in the identifying unit 40.

The external sound may be a real voice signal of a user.

Figure 3:
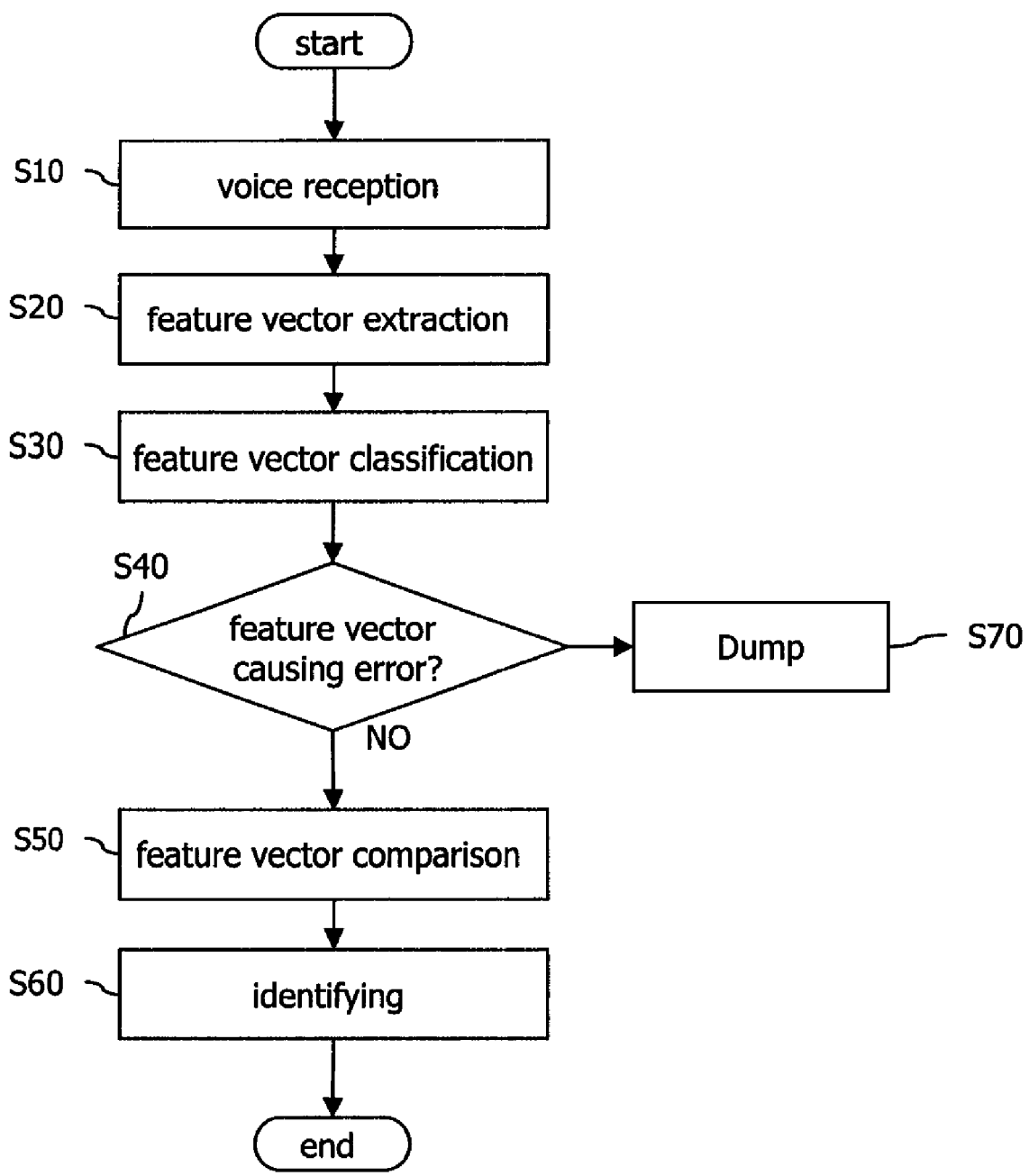
FIG. 3 is a flowchart showing a method for identifying a user by a service robot for domestic use in accordance with one embodiment of the present invention.

FIG. 3 is a flowchart showing a method for identifying who a user is, by a service robot for domestic use, in accordance with one embodiment of the present invention.

As shown in FIG. 3, the method for identifying who the user is, by the service robot for domestic, use may comprise a voice receiving step (S10), a feature vector extracting step (S20), a feature vector classifying step (S30), a step of determining whether a feature vector causes a user identification error (S40), a step of comparing a first-type feature vector without causing the user identification error with user models (S50), and a step of identifying who the user is (S60).

At the determining step (S40), according to the classification result at the feature vector classifying step (S30), if the feature vector is one causing the user identification error, namely, a second-type feature vector, the feature vector, namely, the second-type feature vector is not used for the comparison with the user models, to be instead dumped (S70).

Here, the maximum likelihood method may be applied when comparing the feature vector with the user models. Also, it can be applied when comparing the first-type feature vector with the user models.

Figure 4:
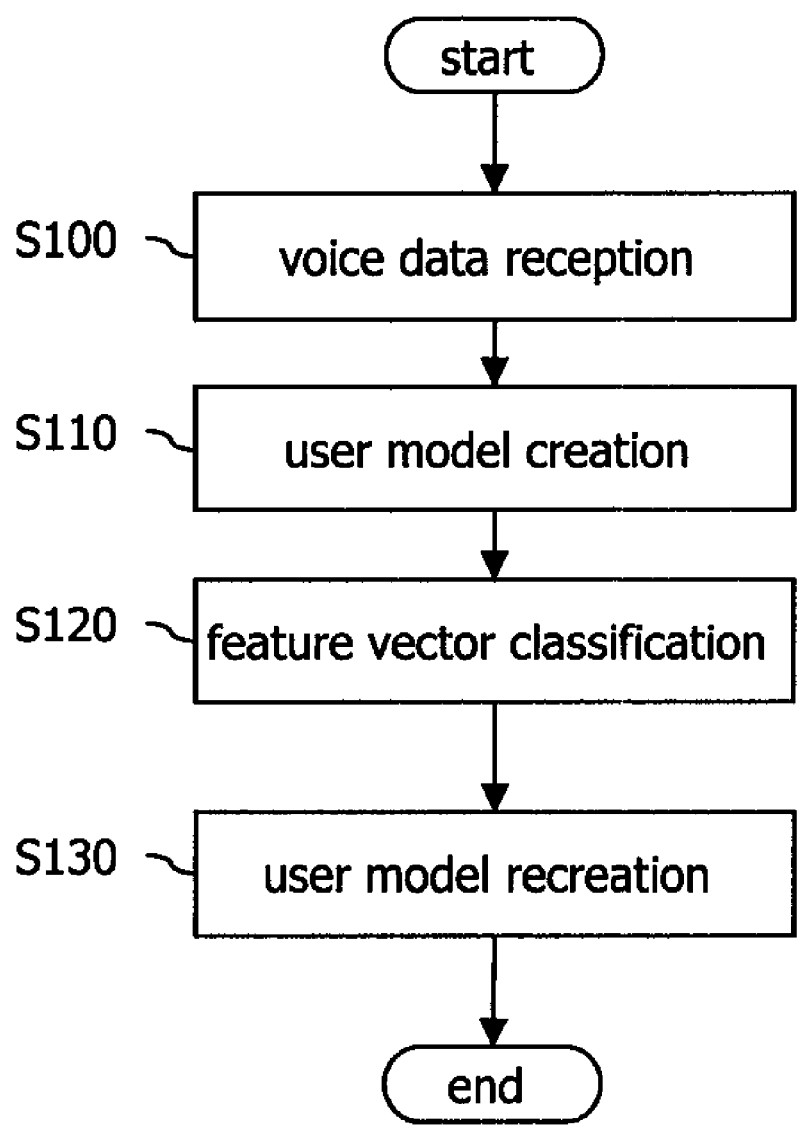
FIG. 4 is a flowchart showing a method for setting user models in accordance with one embodiment of the present invention.

FIG. 4 is a flowchart showing a method for setting user models in accordance with one embodiment of the present invention.

As shown in FIG. 4, the method for setting the user model may comprise receiving voice data for statistics (S100), creating user models (S110), classifying feature vectors (S120), and recreating user models (S130).

That is, the method for identifying who the user is, by the service robot for domestic use, in accordance with the one embodiment of the present invention may be implemented by receiving the voice signal for statistics (S100), and creating (setting) user models by extracting feature vectors from the voice signal and storing the feature vectors without causing a user identification error, which are discriminated from the extracted feature vectors.

It is determined whether the feature vectors cause the user identification error. Accordingly, the feature vectors causing the user identification error and the feature vectors not causing the user identification error are used to reset (recreate) two user models for each user (S130).

As such, in the method for identifying who the user is, by the service robot for domestic use, in accordance with the one embodiment of the present invention, each user eventually has two models, which are then used to identify the corresponding users. Here, feature vectors which are determined as being similar to feature vectors causing errors among feature vectors extracted from voice data inputted for the identifying are excluded upon identifying who the user is, and feature vectors determined as being similar to feature vectors not causing errors are finally determined as being used upon identifying who the user is.

According to the method for identifying who the user is, by the service robot for domestic use, in accordance with the one embodiment of the present invention, it is advantageous to obtain an enhanced user recognition effect only using a relatively small amount of voice data.

The apparatus for identifying who the user is and the method thereof according to the present invention may not be limited to the embodiments. It will be apparent to those skilled in the art that various modifications and variations can be made in the present invention without departing from the spirit or scope of the invention.

The invention claimed is:

1. A service robot for domestic use comprising:
a microphone configured to receive external sound;
a feature vector extracting unit connected to the microphone electrically and configured to extract feature vectors from the external sound;
a feature vector classifying unit connected to the feature vector extracting unit electrically and configured to compare the feature vectors with preset models to classify the feature vectors into a first-type feature vector not causing a user identification error and a second-type feature vector causing the user identification error based on the preset user models;
an identifying unit connected to the feature vector classifying unit and configured to compare the first-type feature vector with the user models and to identify who the user is, based on comparison results;
a controlling unit configured to control a command executing unit according to the determination result of the identifying unit.

2. The service robot of claim 1, wherein the external sound is the user's voice signal.

3. The service robot of claim 1, wherein the feature vector classifying unit classifies feature vectors corresponding to the external sounds into a feature vector with a non-overlapped characteristic in statistical models and a feature vector with an overlapped characteristic in the statistical models.

4. The service robot of claim 3, wherein the identifying unit uses only the feature vector of the external sound having the non-overlapped characteristic in the statistical models, to compare the feature vector of the external sound having the non-overlapped characteristic in the statistical models with the user models according to a maximum likelihood method.

5. A method for identifying who a user is, by a service robot for domestic use, the method comprising:
receiving voice information via an input unit of the service robot;
extracting feature vectors from a signal of the voice via a feature vector extraction unit of the service robot;
comparing the feature vectors with preset user models to classify the feature vectors into a first-type feature vector not causing a user identification error and a second-type feature vector causing the user identification error based on the preset user models via a feature vector classification unit of the service robot; and comparing the first-type feature vector with the user models to identify who the user is via a feature vector comparison unit of the service robot.

6. The method of claim 5, wherein a maximum likelihood method is applied to compare the feature vector with the user models.

7. The method of claim 5, wherein a maximum likelihood method is applied to compare the first-type feature vector with the user models.

8. The method of claim 5, further comprising: comparing at least one of the first-type and second-type feature vectors with the user models, thereby to classify the at least one feature vector into a feature vector with a non-overlapped characteristic in statistical models and a feature vector with an overlapped characteristic.

9. The method of claim 8, further comprising: comparing a feature vector, only which has the non-overlapped characteristic in the statistical models and does not cause the user identification error, with the user models.

* * * * *